Dec. 1, 1942.　　　　F. P. MILLER　　　　2,303,487
REAMER
Filed May 8, 1939　　　　2 Sheets-Sheet 1
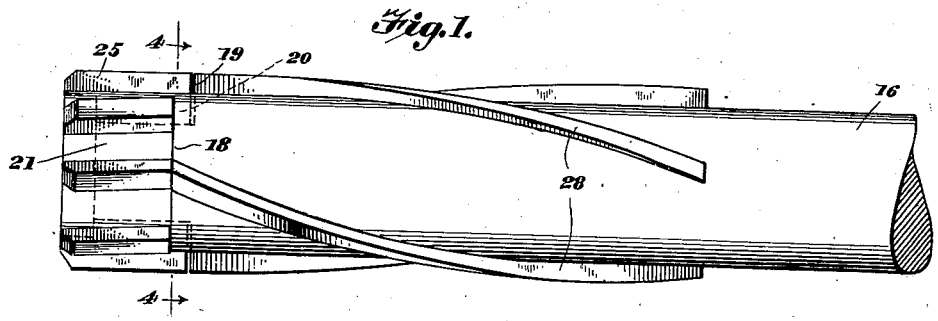
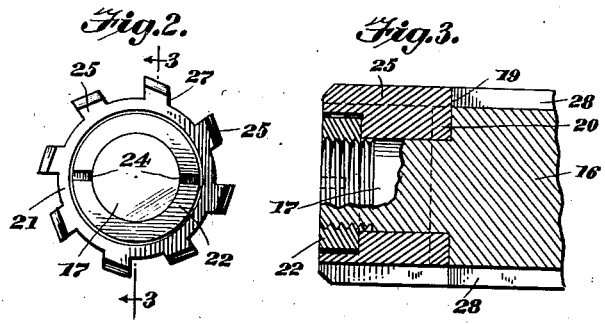 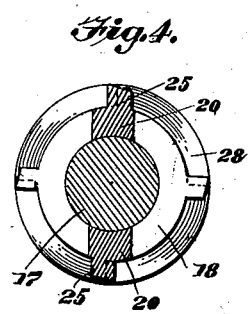
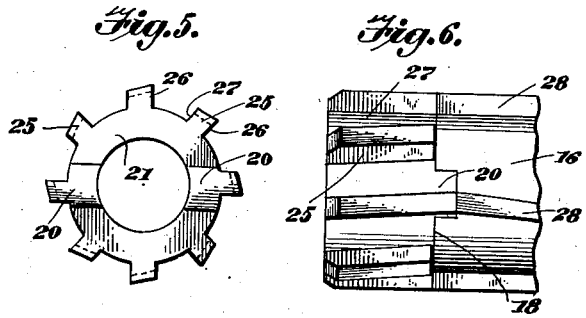 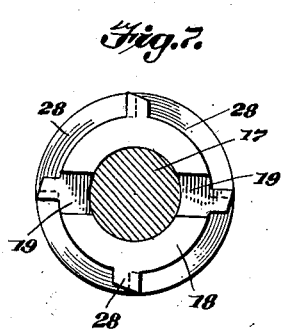
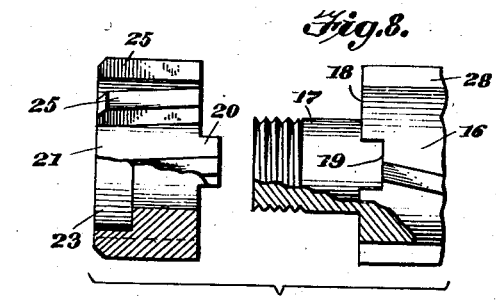
Inventor
FRANK P. MILLER Dec. 1, 1942.     F. P. MILLER     2,303,487
REAMER
Filed May 8, 1939     2 Sheets-Sheet 2
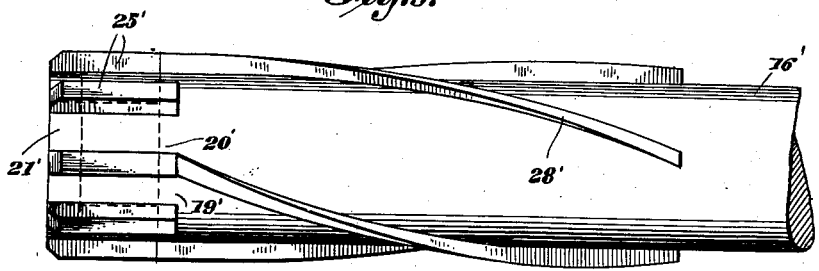
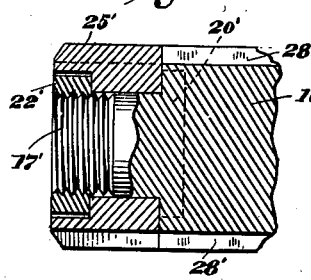
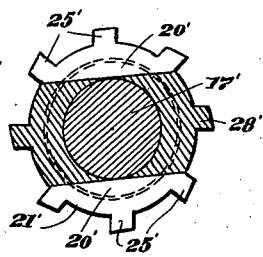
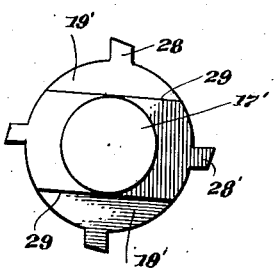
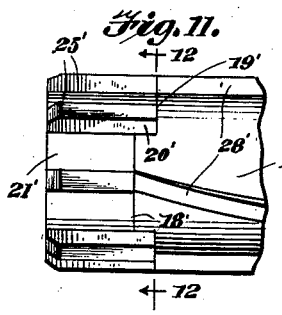
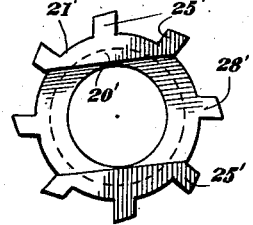
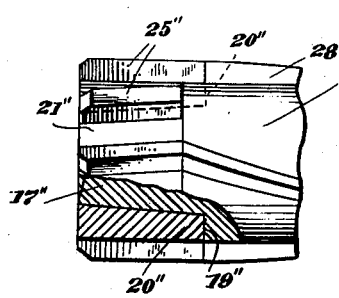
Inventor
FRANK P. MILLER
By E. F. Salter
Attorney Patented Dec. 1, 1942

2,303,487

UNITED STATES PATENT OFFICE 2,303,487

REAMER

Frank P. Miller, Meadville, Pa.

Application May 8, 1939, Serial No. 272,523

11 Claims. (Cl. 77—72)

This invention relates to the art of rotatable cutters, particularly to end-cutters such as reamers and the like. Tools of this class are subjected to maximum wear at their work-engaging ends, and where, as is usually the case, the shank and cutting end are integral, a worn tool becomes unserviceable only at its work-engaging end; the remainder being practically unaffected. However the unserviceable condition of the cutting end renders the entire tool unfit for use because of its inability to maintain its full original cutting diameter, and it must be replaced with a new tool.

An object of the present invention is to provide a reamer, or cutting tool of like nature, having a relatively short, inexpensive, replaceable cutting end detachably secured to the tool shank, and which may economically be made of different metals, i. e., the cutter may be made of high-speed steel or some other superior cutting material while the shank with its guide flutes may be made of some suitable alloy or material which is far less costly than the material comprising the cutter.

Another object is to provide a two-piece reamer comprising a shank with integral guide flutes, and a cutter detachably engageable therewith; with a novel driving connection between the parts designed to impart maximum strength to the cutter.

A further object is to provide a reamer in which the cutting teeth and guide flutes are so arranged as to produce the proper cutting action, accurate guiding of the tool and efficient chip removal.

Other objects will be readily apparent to those skilled in the art.

In the accompanying drawings:

Figure 1 is an elevation of a reamer constructed in accordance with the invention.

Figure 2 is an end view thereof.

Figure 3 is a section taken on the line 3—3 of Figure 2.

Figure 4 is a section taken on the line 4—4 of Figure 1.

Figure 5 is an end elevation from the rear or inner face of the cutter portion.

Figure 6 is a fragmentary elevation, similar to Figure 1, but taken at a right angle thereto.

Figure 7 is an end view of the shank portion with the cutter removed.

Figure 8 is a group elevation, partly in section, of the parts shown in Figure 6, but disassembled.

Figure 9 is an elevation of a reamer using an alternative embodiment of cutting portion.

Figure 10 is a fragmentary axial section taken at the cutter end of Figure 9, and partly in elevation.

Figure 11 is a fragmentary elevation, similar to Figure 9 but taken at a right angle thereto.

Figure 12 is a section taken on the line 12—12 of Figure 11.

Figure 13 is a rear or inner end elevation of the cutter portion of Figure 11.

Figure 14 is an end elevation of the shank portion of Figure 11.

Figure 15 is a fragmentary elevation, partly in section, of a further alternative form of tool.

In the embodiment of the invention illustrated in Figures 1 through 8 the improved reamer comprises a cylindrical shank 16 having a reduced cylindrical axial end extension 17 forming an end shoulder 18. The shoulder 18 is axially recessed at diametrically opposed points to provide drive sockets 19 which receive complemental driving lugs 20 that are integral with a cutter portion 21. The cutter 21 comprises a sleeve fitted over the extension 17 of the shank and held in place by a lock collar 22 threaded over the outer end portion of the extension 17. The collar 22 seats in an axial socket 23 provided in the outer or work-engaging end face of the cutter 21, and has tool engageable means 24 by which, when engaged with a proper tool, the collar may be tightened up on the extension 17 to clamp the cutter 21 between it and the shoulder 18 of the shank.

The cutter is provided with an annular series of spaced teeth 25 having parallel front and rear faces 26 and 27, respectively. The teeth 25 are usually arranged at a left-hand spiral with respect to the axis of the reamer, as shown particularly in Figures 1, 6 and 8 of the drawings, but they may be arranged at a right-hand spiral or parallel with the axis of the reamer to suit various kinds of metal being reamed.

An important feature of the invention is the fact that at least one tooth extends the full length of the cutter and each driving lug 20, whereby the cross sectional area of the driving lugs is increased, as will be apparent from Figure 3, and their strength made greater than would be the case if the teeth terminated in the transverse plane of the shoulder 18. Reamers made in accordance with this invention are produced in small sizes down to ⅜" in diameter, so that adequate reinforcement of the driving lugs is very important.

The shank portion 16 has on its peripheral face an annular series of guide flutes 28 arranged in spaced relation and disposed each in a right hand or left hand spiral. These flutes are of substantially the same size and cross sectional configuration as the cutter teeth and are made integral with the shank. They are, however, fewer in number than the cutter teeth so that the space, circumferentially of the shank, between adjacent guide flutes is much greater than the space between adjacent cutter teeth. This arrangement greatly facilitates chip removal without sacrifice of guide function.

The guide flutes are usually arranged in a steep right hand spiral, as shown in the drawings, and as continuations of every other tooth on the cutter; each flute at its outer end abutting and registering with a cutter tooth. The steepness of the spiral insures that the guide flutes shall surrounded the shank and thus give a large bearing in a hole being reamed while at the same time the relatively large space between adjacent flutes gives increased space for chip removal, which is rendered positive by the steepness of the flute spiral. In the illustrated embodiment, the number of guide flutes on the shank portion is half the number of teeth on the cutter portion. The ratio may, however, be varied as desired.

The alternative structural embodiment of the invention illustrated in Figures 9 through 14 is substantially identical with the previously described embodiment and has the same general arrangement of shank portion 16' with reduced end extension 17' receiving the cutter portion 21' which is retained thereon by the lock collar 22', and spiral guide flutes 28' on the shank portion. Only half as many guide flutes are employed as there are teeth 25' on the cutter.

However, in this form the circumferential extent of the driving lugs 20' includes at least three of the cutter teeth. This arrangement is best secured by providing the shank-end sockets 19' as seats having diametrically opposed flat bottoms 29 arranged as parallel chords of the circle defined by the periphery of the shank, as best shown in Figure 14.

The driving lugs 20' are made complemental to their shank-end seats 19' and in consequence a driving connection is effected which gives maximum contact between the connecting surfaces and a greatly increased cross sectional area of driving lugs. As in the previously described embodiment, the cutter teeth 25' are extended the full length of the driving lugs longitudinally of the cutter.

A further alternative embodiment of the invention is shown in Figure 15 wherein the reamer shank 16", guide flutes 28", cutter teeth 25", as well as their angles, spacing and arrangement is the same as that of the form illustrated in Figure 1. In the form as shown in Figure 15, however, the driving connection between the cutter 21" and the shank 16" is obtained by means of a tapered fit between the cutter and the shank end extension 17", in combination with the driving lugs 20" seating in their receiving sockets 19" in the end of the shank. In the form, as in the others, the cutter teeth are extended the full length of the driving lugs to provide increased cross sectional area therefor with consequent increased strength.

In all forms of the invention the detachable cutter portions are readily replaceable when worn, and an enormous advantage is gained over the long-fluted unitary type of reamer in that it is possible, for any given piece of work, to make use of a cutter having its teeth arranged in a manner to give best cutting results for that particular work, while the guide flutes on the shank portion may have an entirely different arrangement and one best suited for maximum guide bearing and rapid chip removal. In other words, it is possible to achieve exactly the right combination of angles and spirals for maximum efficiency upon any given piece of work. At the same time, only the cutter portion need be made of superior, and therefore expensive material; the shank portion with its guide flutes is practically unaffected by use. The cutter portion being much shorter than the conventional type of shell reamer, is much cheaper to produce and therefore much more economical to use.

What is claimed is:

1. A reamer comprising a shank portion, a cutter portion, means detachably connecting said cutter portion to said shank portion, a driving lug on one portion, the other portion having a socket receiving said lug, cutting teeth on said cutter portion, spirally arranged guide flutes on said shank portion in end to end relation with teeth on the cutter portion, and the number of guide flutes being less than the number of teeth.

2. A reamer comprising a shank portion, a cutter portion, means detachably connecting said cutter portion to said shank portion, driving lugs on said cutter portion and extending axially therefrom, said shank portion having driving sockets receiving said lugs, cutting teeth on said cutter portion, certain of said teeth extending the full length of said lugs and comprising an integral part thereof, and guide flutes on said shank portion in end to end relation with said teeth on the cutter portion extending the full length thereof.

3. A reamer comprising a shank portion, a cutter portion, means detachably connecting said cutter portion to said shank portion, connecting members extending axially from said cutter portion, said shank portion having connecting means cooperatively engaging said members, cutting teeth on said cutter portion, certain of said teeth extending at full height through said members, guide flutes on said shank portion in end to end meeting relation to teeth on the cutter portion, and the number of guide flutes being less than the number of teeth.

4. A reamer comprising a shank portion having spirally arranged guide flutes thereon, a cutter portion, means detachably connecting said cutter portion to one end of said shank portion as an axial continuation thereof, cutting teeth on said cutter portion only, certain of said teeth forming longitudinal continuations of said guide flutes, and the number of teeth being greater than the number of guide flutes.

5. A reamer comprising a shank portion having spirally arranged guide flutes thereon, a cutter portion, means detachably connecting said cutter portion to said shank portion as an axial continuation thereof, a driving connection between said portions, cutting teeth on said cutter, and the number of cutter teeth being in excess of the number of guide flutes.

6. A reamer comprising a shank portion having spirally arranged guide flutes thereon, a cutter portion, means detachably connecting said cutter portion to said shank portion as an axial continuation thereof, socket means in said shank portion, said cutter portion having integral extensions engaging said socket means to establish a driving connection between said portions, teeth on the cutter portion and extending full length thereof integral with said extensions, certain of said teeth being in end to end abutting relation with said guide flutes and angled with respect thereto.

7. A reamer comprising a shank portion having spirally arranged guide flutes thereon, a cutter portion, means detachably connecting said cutter portion to said shank portion as an axial continuation thereof, said shank portion having a recess therein, a driving lug extending axially from said cutter portion in said recess, teeth on said cutter portion, at least one of said teeth forming an integral part of said driving lug, the number of teeth being in excess of the number of guide flutes, and certain of said teeth being in end to end abutting relation with said guide flutes and angled with respect thereto.

8. A reamer comprising a shank portion having integral guide flutes arranged spirally thereon, a cutter portion consisting of a material differing in quality from that of the shank portion, means detachably connecting said cutter portion to said shank portion cutting teeth on said cutter portion only, and the number of teeth being in excess of the number of guide flutes.

9. A reamer comprising a shank portion having integral guide flutes spirally arranged thereon, a cutter portion, means detachably connecting said cutter portion to said shank portion as an axial continuation thereof, said portions consisting of different materials, cutting teeth on said cutter portion only and integral therewith, and the number of teeth being double the number of guide flutes.

10. A reamer comprising a shank portion, a cutter portion, means detachably connecting said cutter portion to one end of said shank portion as an axial continuation thereof, teeth on said cutter portion, guide flutes on said shank portion, and certain of said teeth and flutes being disposed in end-to-end relation and being mutually angled relative to one another.

11. A reamer comprising a shank portion having spirally arranged guide flutes thereon, a cutter portion, means detachably connecting said cutter portion to one end of said shank portion as an axial continuation thereof, and teeth on said cutter portion arranged at a spiral opposite to that of the guide flutes.

FRANK P. MILLER.